United States Patent
Liu et al.

(10) Patent No.: US 11,067,322 B2
(45) Date of Patent: Jul. 20, 2021

(54) METHOD AND APPARATUS FOR PREVENTING COMPONENT MALFUNCTION USING ACCELEROMETERS

(71) Applicant: Lennox Industries Inc., Richardson, TX (US)

(72) Inventors: Wenqian Liu, Plano, TX (US); Umesh Gokhale, Irving, TX (US); Eric Berg, The Colony, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 16/261,801

(22) Filed: Jan. 30, 2019

(65) Prior Publication Data

US 2020/0240689 A1 Jul. 30, 2020

(51) Int. Cl.
*F25B 49/02* (2006.01)
*G05B 19/042* (2006.01)

(52) U.S. Cl.
CPC ............ *F25B 49/02* (2013.01); *F25B 49/022* (2013.01); *F25B 49/027* (2013.01); *G05B 19/042* (2013.01); *F25B 2500/13* (2013.01); *F25B 2600/0253* (2013.01); *F25B 2600/111* (2013.01); *G05B 2219/2614* (2013.01)

(58) Field of Classification Search
CPC ...... F25B 49/02; F25B 49/027; F25B 49/022; F25B 2600/0253; F25B 2500/13; G05B 2219/2614; G05B 19/042
See application file for complete search history.

(56) References Cited

U.S. PATENT DOCUMENTS

| | | |
|---|---|---|
| 6,795,752 B1 | 9/2004 | Zhao et al. |
| 7,735,368 B2 | 6/2010 | Nakatani |
| 8,417,482 B2 | 4/2013 | Bohan et al. |
| 8,670,870 B1 | 3/2014 | Bush, Jr. et al. |
| 9,267,961 B2 | 2/2016 | Lin |
| 9,449,435 B2 | 9/2016 | Kalinadhabhotla et al. |
| 9,683,563 B2 * | 6/2017 | Caillat ............... F04B 39/0027 |
| 2007/0005269 A1 | 1/2007 | Mitchell |
| 2008/0148818 A1 | 6/2008 | Speranza |

(Continued)

FOREIGN PATENT DOCUMENTS

| | | |
|---|---|---|
| EP | 3073201 A1 | 9/2016 |
| WO | 2017143394 A1 | 8/2017 |

*Primary Examiner* — Rocio Del Mar Perez-Velez
*Assistant Examiner* — Vi N Tran
(74) *Attorney, Agent, or Firm* — Shackelford, Bowen, McKinley & Norton, LLP

(57) ABSTRACT

A method of minimizing components of a heating, ventilation, and air conditioning (HVAC) system from malfunctioning, the method includes measuring, by an accelerometer associated with at least one component of the HVAC system, vibration of the at least one component and receiving, by a controller, actual vibration data reflective of the measured vibration. The method further includes determining, using the controller, whether the actual vibration data is greater than pre-defined acceptable baseline vibration data by more than a pre-defined acceptable amount and responsive to a positive determination in the determining step, adding, by the controller, as a deadband frequency, an operational frequency of the at least one component corresponding to the actual vibration data.

12 Claims, 5 Drawing Sheets

(56) References Cited

U.S. PATENT DOCUMENTS

| | | |
|---|---|---|
| 2009/0145226 A1 | 6/2009 | Cai |
| 2009/0292505 A1* | 11/2009 | Van Dyke ................ G01H 1/00 |
| | | 702/184 |
| 2011/0010130 A1 | 1/2011 | Hadden et al. |
| 2013/0030724 A1 | 1/2013 | Friedlander et al. |
| 2014/0039687 A1* | 2/2014 | Mercer .................. G05D 23/19 |
| | | 700/276 |
| 2016/0282026 A1* | 9/2016 | Park ......................... F24F 1/22 |
| 2017/0328930 A1* | 11/2017 | Unsal ...................... G01P 13/00 |
| 2018/0129231 A1* | 5/2018 | Meeuwsen ............ G05D 19/02 |
| 2018/0202679 A1 | 7/2018 | Berg et al. |
| 2019/0154494 A1* | 5/2019 | Gross ....................... G06F 1/20 |
| 2019/0219280 A1* | 7/2019 | Chitrala ................. F24F 13/24 |

* cited by examiner

METHOD AND APPARATUS FOR PREVENTING COMPONENT MALFUNCTION USING ACCELEROMETERS

TECHNICAL FIELD

The present invention relates generally to heating, ventilation, and air conditioning (HVAC) systems and, more particularly, but not by way of limitation, to monitoring vibrations of HVAC system components and adjusting operation thereof at certain frequencies to prevent HVAC system component malfunction.

BACKGROUND

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air).

SUMMARY

A method of minimizing components of a heating, ventilation, and air conditioning (HVAC) system from malfunctioning, the method includes measuring, by an accelerometer associated with at least one component of the HVAC system, vibration of the at least one component and receiving, by a controller, actual vibration data reflective of the measured vibration. The method further includes determining, using the controller, whether the actual vibration data is greater than pre-defined acceptable baseline vibration data by more than a pre-defined acceptable amount and responsive to a positive determination in the determining step, adding, by the controller, as a deadband frequency, an operational frequency of the at least one component corresponding to the actual vibration data.

A heating, ventilation, and air conditioning (HVAC) system includes an accelerometer associated with at least one component of the HVAC system, wherein the accelerometer is configured to measure vibration of the at least one component. The system further includes a controller configured to communicate with the accelerometer. The controller is configured to receive actual vibration data reflective of the measured vibration, determine whether the actual vibration data is greater than pre-defined acceptable baseline vibration data by more than a pre-defined acceptable amount, and responsive to a positive determination, add, by the controller, as a deadband frequency, an operational frequency of the at least one component corresponding to the actual vibration data.

A method of minimizing components of a heating, ventilation, and air conditioning (HVAC) system from malfunctioning, the method includes measuring, by an accelerometer associated with at least one component of the HVAC system, vibration of the at least one component, receiving, by a controller, actual vibration data reflective of the measured vibration, and determining, using the controller, whether the actual vibration data is greater than pre-defined acceptable baseline vibration data by more than a pre-defined acceptable amount. Responsive to a positive determination in the determining step, adding, by the controller, as a deadband frequency, an operational frequency of the at least one component corresponding to the actual vibration data and allowing, by the controller, operation of the at least one component at all frequencies except the deadband frequency.

BRIEF DESCRIPTION

A more complete understanding of embodiments of the present invention may be obtained by reference to the following detailed description when taken in conjunction with the accompanying drawings wherein.

DETAILED DESCRIPTION

To direct operations of the circulation fan and other components, each HVAC system includes at least one controller. In addition to directing the operation of the HVAC system, the at least one controller may also be used to monitor various components, also referred to as equipment, of the HVAC system to determine if the HVAC system components are functioning appropriately. Thus, the at least one controller can detect an occurrence of a service event, generate a service alarm, and send a message to a user interface or a service provider. The service event may be, for example, a trigger of a service indicator, an expiration of a service event timer for a component of the HVAC system, component malfunction, and the like.

Figure 1:
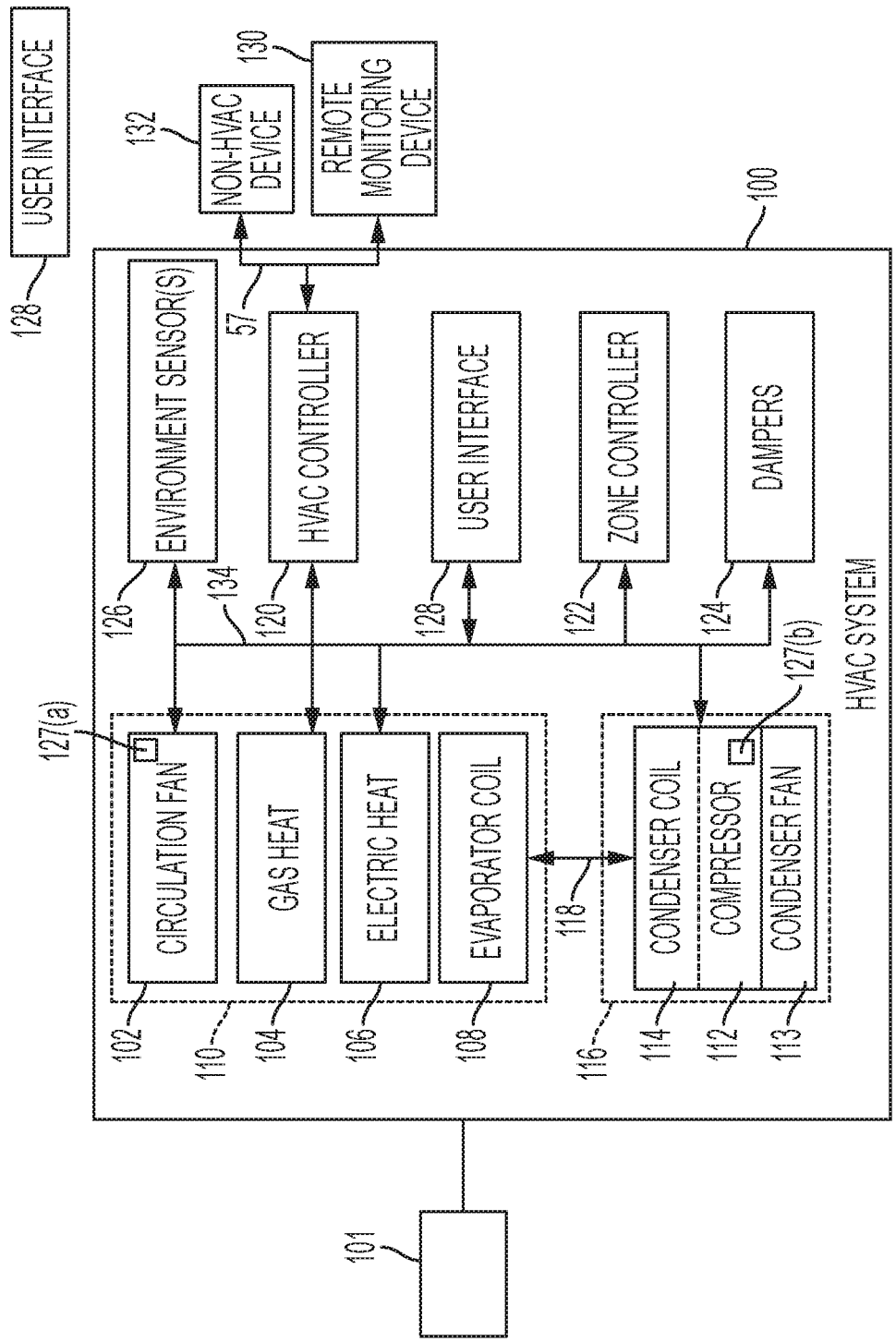
FIG. 1 is a block diagram of an illustrative HVAC system.

FIG. 1 illustrates an HVAC system 100. In a typical embodiment, the HVAC system 100 is a networked HVAC system configured to condition air via, for example, heating, cooling, humidifying, or dehumidifying. The HVAC system 100 can be a residential system or a commercial system such as, for example, a roof top system. For illustration, the HVAC system 100 as illustrated in FIG. 1 includes various components; however, in other embodiments, the HVAC system 100 may include additional components that are not illustrated but typically included within HVAC systems.

The HVAC system 100 includes a variable-speed circulation fan 102, a gas heat 104, or an electric heat 106 typically associated with the variable-speed circulation fan 102, and a refrigerant evaporator coil 108, also typically associated with the variable-speed circulation fan 102. The variable-speed circulation fan 102, the gas heat 104, the electric heat 106, and the refrigerant evaporator coil 108 are collectively referred to as an "indoor unit" 110. In a typical embodiment, the indoor unit 110 is located within, or in close proximity to, an enclosed space 101. The HVAC system 102 also includes a variable-speed compressor 112, an associated condenser coil 114, and a condenser fan 113, which are typically referred to as an "outdoor unit" 116. In a typical embodiment, the condenser fan 113 may be at least one of a fixed-speed condenser fan, a multi-speed condenser fan, and a variable-speed condenser fan. In various embodiments, the outdoor unit 116 is, for example, a rooftop unit or a ground-level unit. The variable-speed compressor 112 and the associated condenser coil 114 are connected to an associated evaporator coil 108 by a refrigerant line 118. In a typical embodiment, the variable-speed compressor 112 is, for example, a single-speed compressor or a variable-speed compressor. The variable-speed circulation fan 102, sometimes referred to as a blower, is configured to operate at different capacities (i.e., variable motor speeds) to circulate air through the HVAC system 100, whereby the circulated air is conditioned and supplied to the enclosed space 101. For illustrative purposes, only variable-speed condenser fan 113 is disclosed; however, in other embodiments, fixed speed and multi-speed condenser fans may be used as required. Additionally, for illustrative purposes, only variable-speed compressor 112 is disclosed; however, in other embodiments, fixed speed compressors may be used as required.

Still referring to FIG. 1, the HVAC system 100 includes an HVAC controller 120 that is configured to control operation of the various components of the HVAC system 100 such as, for example, the variable-speed circulation fan 102, the gas heat 104, the electric heat 106, the variable-speed compressor 112, and the condenser fan 113. In some embodiments, the HVAC system 100 can be a zoned system. In such embodiments, the HVAC system 100 includes a zone controller 122, dampers 124, and a plurality of environment sensors 126. In a typical embodiment, the HVAC controller 120 cooperates with the zone controller 122 and the dampers 124 to regulate the environment of the enclosed space 101.

The HVAC controller 120 may be an integrated controller or a distributed controller that directs operation of the HVAC system 100. In a typical embodiment, the HVAC controller 120 includes an interface to receive, for example, thermostat calls, component health data, temperature setpoints, blower control signals, environmental conditions, and operating mode status for various zones of the HVAC system 1. In a typical embodiment, the HVAC controller 120 also includes a processor and a memory to direct operation of the HVAC system 100 including, for example, a speed of the variable-speed circulation fan 102.

Still referring to FIG. 1, in some embodiments, the plurality of environment sensors 126 are associated with the HVAC controller 120 and also optionally associated with a user interface 128. In some embodiments, the user interface 128 provides additional functions such as, for example, operational, diagnostic, status message display, and a visual interface that allows at least one of an installer, a user, a support entity, and a service provider to perform actions with respect to the HVAC system 100. In some embodiments, the user interface 128 is, for example, a thermostat of the HVAC system 100. In other embodiments, the user interface 128 is associated with at least one sensor of the plurality of environment sensors 126 to determine the environmental condition information and communicate that information to the user. The user interface 128 may also include a display, buttons, a microphone, a speaker, or other components to communicate with the user. Additionally, the user interface 128 may include a processor and memory that is configured to receive user-determined parameters, and calculate operational parameters of the HVAC system 100 as disclosed herein.

In a typical embodiment, the HVAC system 100 is configured to communicate with a plurality of devices such as, for example, a monitoring device 130, a communication device 132, and the like. In a typical embodiment, the monitoring device 130 is not part of the HVAC system. For example, the monitoring device 130 is a server or computer of a third party such as, for example, a manufacturer, a support entity, a service provider, and the like. In other embodiments, the monitoring device 130 is located at an office of, for example, the manufacturer, the support entity, the service provider, and the like.

In a typical embodiment, the communication device 132 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In a typical embodiment, the communication device 132 includes at least one processor, memory and a user interface, such as a display. One skilled in the art will also understand that the communication device 132 disclosed herein includes other components that are typically included in such devices including, for example, a power supply, a communications interface, and the like.

The zone controller 122 is configured to manage movement of conditioned air to designated zones of the enclosed space. Each of the designated zones include at least one conditioning or demand unit such as, for example, the gas heat 104 and at least one user interface 128 such as, for example, the thermostat. The zone-controlled HVAC system 100 allows the user to independently control the temperature in the designated zones. In a typical embodiment, the zone controller 122 operates electronic dampers 124 to control air flow to the zones of the enclosed space.

In some embodiments, a data bus 134, which in the illustrated embodiment is a serial bus, couples various components of the HVAC system 100 together such that data is communicated therebetween. In a typical embodiment, the data bus 134 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 134 may include an Accelerated Graphics Port (AGP) or other graphics bus, a Controller Area Network (CAN) bus, a front-side bus (FSB), a HYPERTRANSPORT (HT) interconnect, an INFINI-BAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 134 may include any number, type, or configuration of data buses 134, where appropriate. In particular embodiments, one or more data buses 134 (which may each include an address bus and a data bus) may couple the HVAC controller 120 to other components of the HVAC system 100. In other embodiments, connections between various components of the HVAC system 100 are wired. For example, conventional cable and contacts may be used to couple the HVAC controller 120 to the various components. In some embodiments, a wireless connection is employed to provide at least some of the connections between components of the HVAC system such as, for example, a connection between the HVAC controller 120 and the variable-speed circulation fan 102 or the plurality of environment sensors 126.

Typically, in HVAC systems, most sound or noise is generated via rotating equipment and air and fluid movement through ducts and pipes. This movement results in vibration of the various components of the HVAC system 100. For example, for package rooftop units and residential units, severe vibration can be observed when certain components of the HVAC system 100 such as, for example, the variable-speed circulation fan 102 and the variable-speed compressor 112 operate at certain speeds. These severe vibrations may result in premature component failure due to fatigue, high stress, and the like. Controlling vibrations of HVAC system components or adjusting operation thereof at certain frequencies is important since vibration is the primary source of noise in HVAC systems. HVAC systems that neglect to properly address vibrations may result in component malfunction, noise, and, in some cases, catastrophic failure such as, for example, piping leakage, top panel deformation, unstable HVAC system operation, loss of comfort, and the like. In an effort to monitor vibration of HVAC system components and prevent component malfunction, exemplary embodiments disclose placing accelerometers at various locations within the HVAC system 100. In the context of the present application, an accelerometer is defined as a device that detects, monitors, and measures vibration in machinery.

The HVAC system 100 includes a plurality of accelerometers 127a, 127b that are positioned at various locations within the HVAC system 100 that are prone to excessive vibrations. For example, the plurality of accelerometers 127a, 127b may be positioned at discharge line elbows, discharge line to condenser inlet connection, top panel, the variable-speed circulation fan 102, the variable-speed compressor 112, and the like. In particular, a first accelerometer 127(a) is positioned on the variable-speed circulation fan 102 and a second accelerometer 127(b) is positioned on the variable-speed compressor 112. For illustrative purposes, only two accelerometers 127(a), 127(b) are disclosed as being positioned on the variable-speed circulation fan 102 and the variable-speed compressor 112, respectively; however, in alternative embodiments, additional accelerometers may be positioned on other components as dictated by design requirements.

In a typical embodiment, the first and second accelerometers 127(a), 127(b) are configured to measure vibration of the HVAC system components such as, for example, the variable-speed circulation fan 102 and the variable-speed compressor 112. The measured vibration ("vibration data") of the variable-speed circulation fan 102 and the variable-speed compressor 112 is utilized to determine frequencies or operational speeds ("deadband frequencies") at which severe vibrations may occur. In the context of the present application, deadband frequencies is defined as frequencies or operational speeds at which operation of components of the HVAC system is blocked or adjusted due to severe vibrations.

In some embodiments, the first and second accelerometers 127(a), 127(b) may be positioned by a technician at the HVAC system 100 installation site. After installation, the technician operates the HVAC system components such as, for example, the variable-speed circulation fan 102 and the variable-speed compressor 112 over time and measures vibration data from the first and second accelerometers 127(a), 127(b). For example, the first and second accelerometers 127(a), 127(b) arm configured to measure vibration of the variable-speed circulation fan 102 and the variable-speed compressor 112, respectively, at various times such as, for example, startup, during steady-state operation, and shut down. The measured vibration data of the variable-speed circulation fan 102 and the variable-speed compressor 112 is utilized by the technician to determine frequencies or operational speeds (deadband frequencies) that exceed pre-defined acceptable baseline-vibration data due to severe vibrations. The technician updates the HVAC controller 120 with information pertaining to the deadband frequencies for the HVAC system components. The HVAC controller 120 blocks operation of the variable-speed circulation fan 102 and the variable-speed compressor 112 at the determined deadband frequencies to prevent component malfunction. In particular, the HVAC controller 120 operates the variable-speed circulation fan 102 and the variable-speed compressor 112 at all frequencies except the deadband frequencies.

In other embodiments, the first and second accelerometers 127(a), 127(b) may be installed within the HVAC system 100 by the manufacturer. After installation of the HVAC system 100, the HVAC controller 120 operates the HVAC system components such as, for example, the variable-speed circulation fan 102 and the variable-speed compressor 112 over time and measures the vibration data from the first and second accelerometers 127(a), 127(b). For example, the first and second accelerometers 127(a), 127(b) are configured to measure vibration of the variable-speed circulation fan 102 and the variable-speed compressor 112, respectively, at various times such as, for example, startup, during steady-state operation, and shut down. Vibration data corresponding to the variable-speed circulation fan 102 and the variable-speed compressor 112 is forwarded to the HVAC controller 120. The HVAC controller 120 utilizes the vibration data to determine frequencies or operational speeds (deadband frequencies) that exceed pre-defined acceptable baseline-vibration data due to severe vibrations. The HVAC controller 120 blocks operation of the variable-speed circulation fan 102 and the variable-speed compressor 112 at the determined deadband frequencies to prevent component malfunction.

In some embodiments, the pre-defined acceptable baseline-vibration data may be calculated by the HVAC controller 120. In alternate embodiments, the pre-defined pre-defined acceptable baseline-vibration data may be set in advance by the manufacturer. The HVAC controller 120 blocks operation of the variable-speed circulation fan 102 and the variable-speed compressor 112 at the determined deadband frequencies to prevent component malfunction. Additionally, the HVAC controller 120 is configured to periodically measure vibration of the variable-speed circulation fan 102 and the variable-speed compressor 112, respectively, to adjust the deadband frequencies pertaining to the HVAC system components to accommodate changes due to weather and system wear and tear such as, for example, loose screws, dirty heat exchangers, and the like.

In a typical embodiment, the first and second accelerometers 127(a), 127(b) are configured to communicate with the HVAC controller 120. In particular, the first and second accelerometers 127(a), 127(b) are configured to communicate vibration data of the HVAC system components such as, for example, the variable-speed circulation fan 102 and the variable-speed compressor 112 to the HVAC controller 120. In some embodiments, the data bus 134 may couple the HVAC controller 120 to the first and second accelerometers 127(a), 127(b). In other embodiments, connections between the HVAC controller 120 and the first and second accelerometers 127(a), 127(b) are wired. For example, conventional cable and contacts may be used to couple the HVAC controller 120 to the first and second accelerometers 127(a), 127(b). In some embodiments, a wireless connection is employed to provide at least some of the connections between the HVAC controller 120 and the first and second accelerometers 127(a), 127(b).

Figure 2:
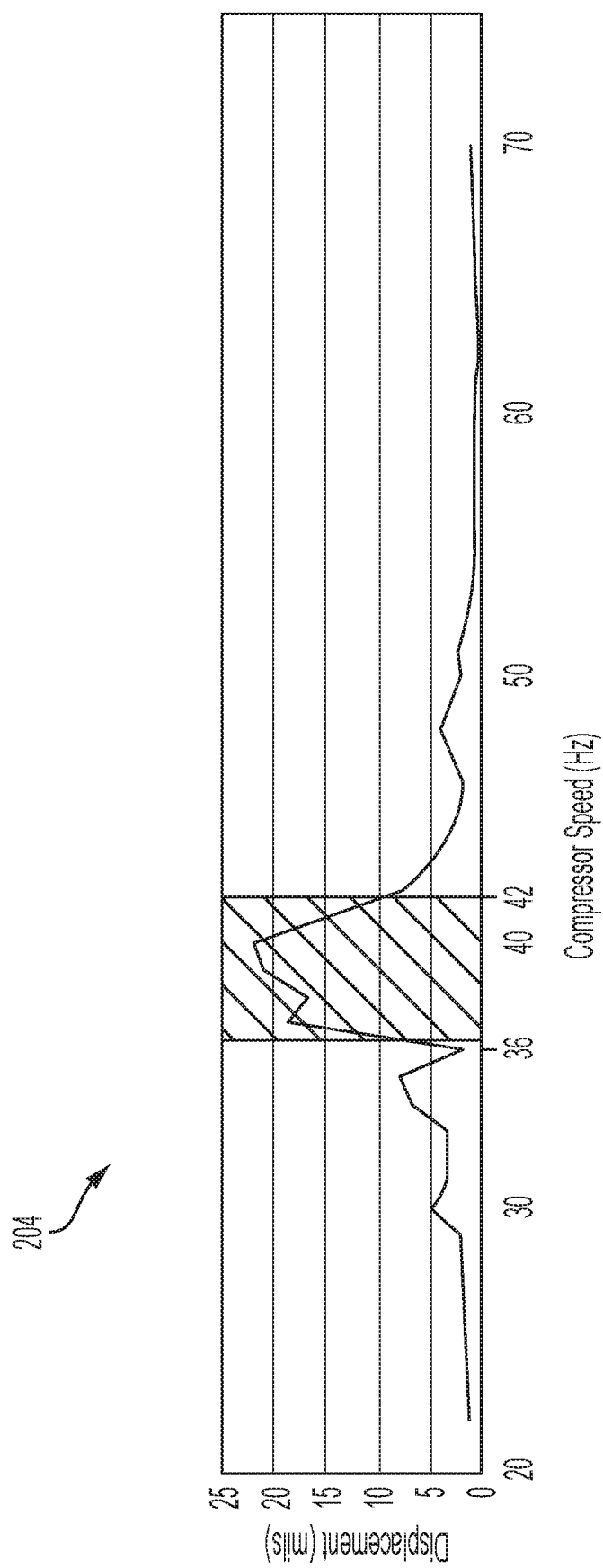
FIG. 2 is a chart illustrating actual vibration data for a variable-speed compressor of the HVAC system according to an illustrative embodiment.

FIG. 2 is a chart illustrating actual vibration data 204 for the variable-speed compressor 112 of the HVAC system 100. For illustrative purposes, FIG. 2 will be described herein relative to FIG. 1. As discussed above, the HVAC controller 120 is configured to receive actual vibration data of the variable-speed compressor 112 from the second accelerometer 127(b). The HVAC controller 120 determines deadband frequencies of the variable-speed compressor 112. In the exemplary embodiment, severe vibration (displacement) occurs at frequencies between 36 Hz and 42 Hz (deadband frequencies). The HVAC controller 120 blocks operation of the variable-speed compressor 112 at the determined deadband frequencies (between 36 Hz and 42 Hz) to prevent component malfunction. In particular, the HVAC controller 120 operates the variable-speed circulation fan 102 and the variable-speed compressor 112 at all frequencies except the deadband frequencies.

Figure 3:
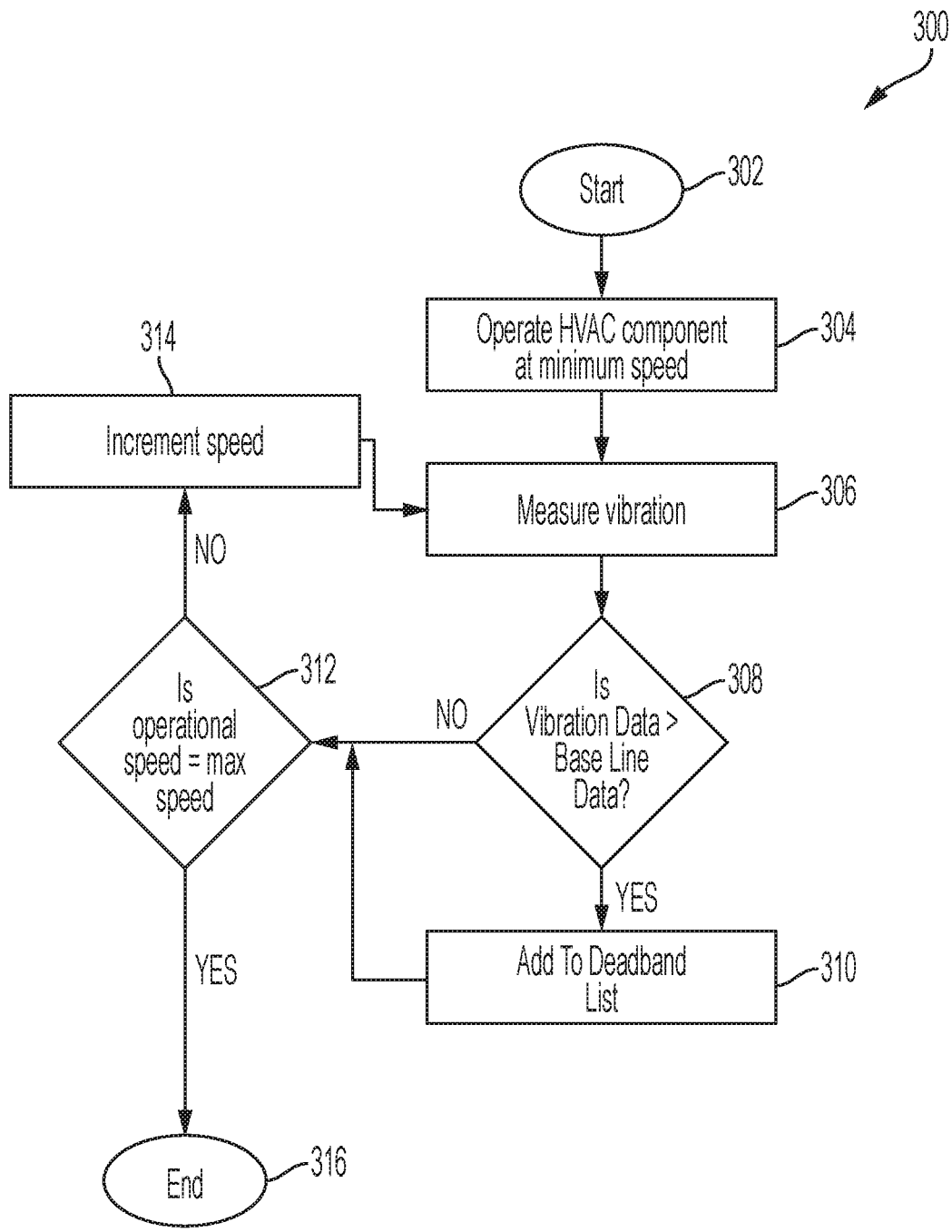
FIG. 3 is a flow diagram illustrating an illustrative process to determine deadband frequencies for HVAC system components according to an exemplary embodiment.

FIG. 3 is a flow diagram illustrating an illustrative process 300 to determine deadband frequencies for HVAC system components. For illustrative purposes, the process 300 will be described herein relative to FIG. 1. The process 300 begins at step 302. At step 304, the HVAC system 100 is operated at minimum speed. At step 306, the first accelerometer 127(a), which is positioned on the variable-speed circulation fan 102, measures vibration of the variable-speed circulation fan 102 at the minimum operating speed. In similar fashion, the second accelerometer 127(b) measures vibration of the variable-speed compressor 112 at the minimum operating speed. At step 308, it is determined whether vibration data of the variable-speed circulation fan 102 or variable-speed compressor 112 from the first and second accelerometers 127(a). 127(b) is greater than pre-defined acceptable baseline vibration data by more than an acceptable amount. In some embodiments, the pre-defined acceptable baseline-vibration data may be calculated by the HVAC controller 120. In alternate embodiments, the pre-defined acceptable baseline-vibration data may be set in advance by the manufacturer. In some embodiments, vibration data from the measurements by the first accelerometer 127(a) and the second accelerometer 127(b) is utilized by the technician to perform the determination. In other embodiments, vibration data from the measurements by the first accelerometer 127(a) and the second accelerometer 127(b) is forwarded to the HVAC controller 120 to perform the determination.

If it is determined at step 308 that the vibration data of the variable-speed circulation fan 102 or variable-speed compressor 112 from the first and second accelerometers 127(a), 127(b) is greater than the pre-defined acceptable baseline vibration data by more than an acceptable amount, the process 300 proceeds to step 310. At step 310, frequencies or operational speed of the variable-speed circulation fan 102 or the variable-speed compressor 112 at which the vibration data is greater than the pre-defined acceptable baseline vibration data by more than an acceptable amount is added as deadband frequencies. The HVAC controller 120 blocks operation of the HVAC system components at the determined deadband frequencies to prevent component malfunction. However, if it is determined at step 308 that the vibration data of the variable-speed circulation fan 102 or variable-speed compressor 112 from the first and second accelerometers 127(a), 127(b) is not greater than the pre-defined acceptable baseline vibration data, the process 300 proceeds to step 312. At step 312, it is determined whether the HVAC system 100 is operating at maximum speed. If it is determined at step 312 that the HVAC system 100 is not operating at maximum speed, the process 300 proceeds to step 314. At step 314, the speed of operation of the HVAC system 100 is gradually increased. From step 314, the process proceeds to step 306. However, if it is determined at step 312 that the HVAC system 100 is operating at maximum speed, the process 300 ends at step 316. For illustrative purposes, the first accelerometer 127(a) and second accelerometer 127(b) are disclosed as being positioned on the variable-speed circulation fan 102 and the variable-speed compressor 112, respectively, for measuring vibrations. However, in other embodiments, the first accelerometer 127(a) and second accelerometer 127(b) may be positioned at other components of the HVAC system 100 such as, for example, the variable-speed condenser fan 113 to measure vibration thereof.

Figure 4:
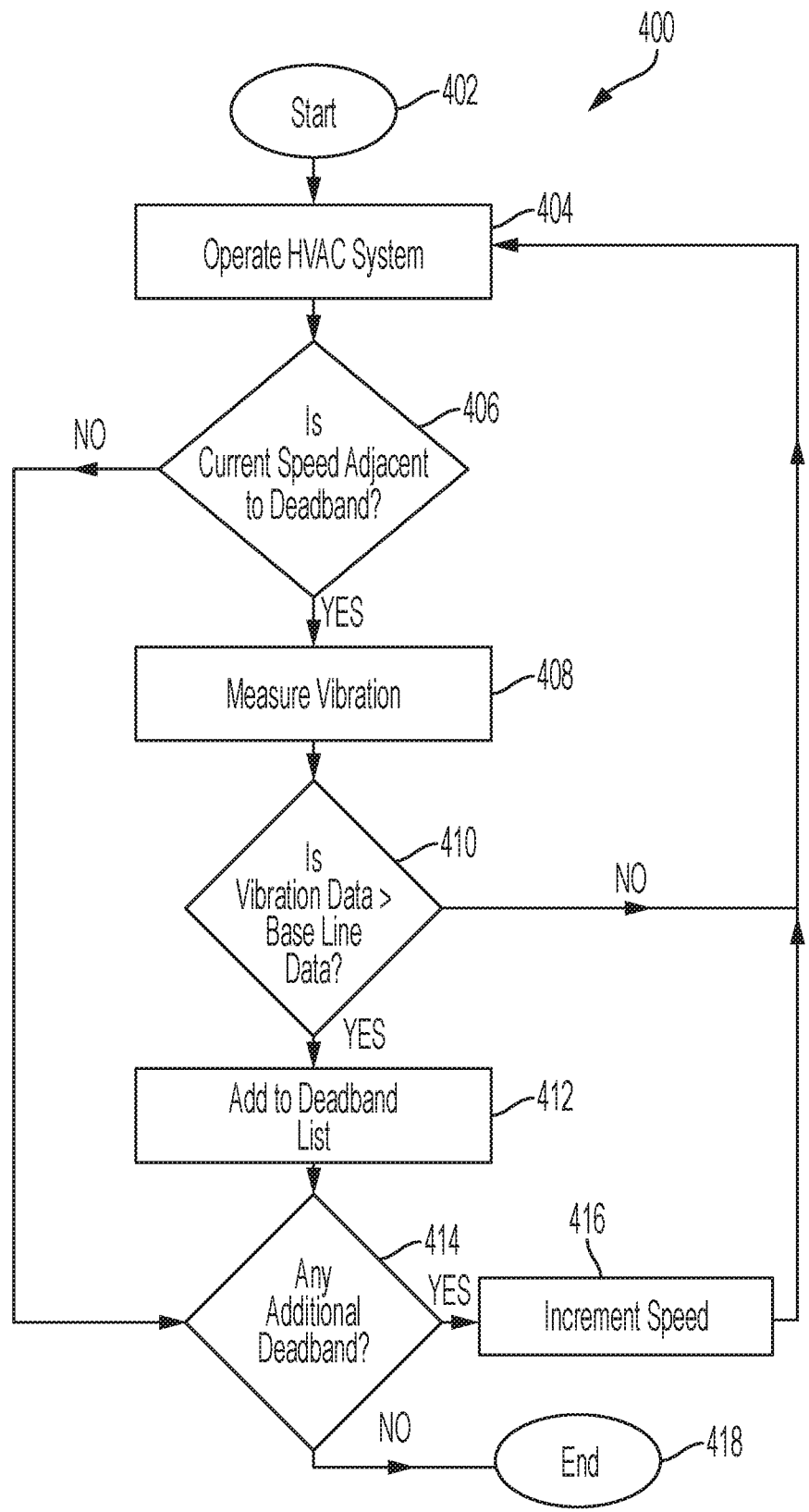
FIG. 4 is a flow diagram illustrating an illustrative process to determine changes in deadband frequencies for HVAC system components according to an exemplary embodiment.

FIG. 4 is a flow diagram illustrating an illustrative process 400 to determine changes in deadband frequencies for HVAC system components. For illustrative purposes, the process 400 will be described herein relative to FIGS. 1 and 3. The process 400 begins at step 402. At step 404, the HVAC system 100 is operated at a certain speed. At 406, it is determined if the operational frequency or operational speed of the variable-speed circulation fan 102 or the variable-speed compressor 112 is adjacent to the deadband frequencies determined in step 310 of FIG. 3. If it is determined at step 406 that the operational frequency or operational speed of the variable-speed circulation fan 102 or the variable-speed compressor 112 is not adjacent to the deadband frequencies determined in step 310 of FIG. 3, the process 400 proceeds to step 414.

However, if it is determined at step 406 that the operational frequency or operational speed of the variable-speed circulation fan 102 or the variable-speed compressor 112 is adjacent to the deadband frequencies determined in step 310 of FIG. 3, the process 400 proceeds to step 408. At step 408, the first accelerometer 127(a), which is positioned on the variable-speed circulation fan 102, measures vibration of the variable-speed circulation fan 102. In similar fashion, the second accelerometer 127(b) measures vibration of the variable-speed compressor 112. At step 410, it is determined whether vibration data of the variable-speed circulation fan 102 or variable-speed compressor 112 from the first and second accelerometers 127(a), 127(b) is greater than the pre-defined acceptable baseline vibration data by more than an acceptable amount. If it is determined at step 410 that the vibration data of the variable-speed circulation fan 102 or variable-speed compressor 112 from the first and second accelerometers 127(a), 127(b) is not greater than the pre-defined acceptable baseline vibration data, the process 400 proceeds to step 404.

However, if it is determined at step 410 that the vibration data of the variable-speed circulation fan 102 or variable-speed compressor 112 from the first and second accelerometers 127(a). 127(b) is greater than the pre-defined acceptable baseline vibration data by more than an acceptable amount, the process 400 proceeds to step 412. At step 412, frequencies or operational speed of the variable-speed circulation fan 102 or the variable-speed compressor 112 at which the vibration data is greater than pre-defined acceptable baseline vibration data by more than an acceptable amount is added as deadband frequencies. The HVAC controller 120 blocks operation of the HVAC system components at the determined deadband frequencies to prevent component malfunction. From step 412, the process 400 proceeds to step 414. At step 414, it is determined whether any additional deadband frequencies are available. If it is determined at step 414 that additional deadband frequencies are available, the process 400 proceeds to step 416. At step 416, the speed of the HVAC system 100 is adjusted. From step 416, the process 400 proceeds to step 404. However, if it is determined at step 414 that no additional deadband frequencies are available, the process 400 ends at step 418. For illustrative purposes, the first accelerometer 127(a) and second accelerometer 127(b) are disclosed as being positioned on the variable-speed circulation fan 102 and the variable-speed compressor 112, respectively, for measuring vibrations. However, in other embodiments, the first accelerometer 127(a) and second accelerometer 127(b) may be positioned at other components of the HVAC system 100 such as, for example, the variable-speed condenser fan 113 to measure vibration thereof.

Figure 5:
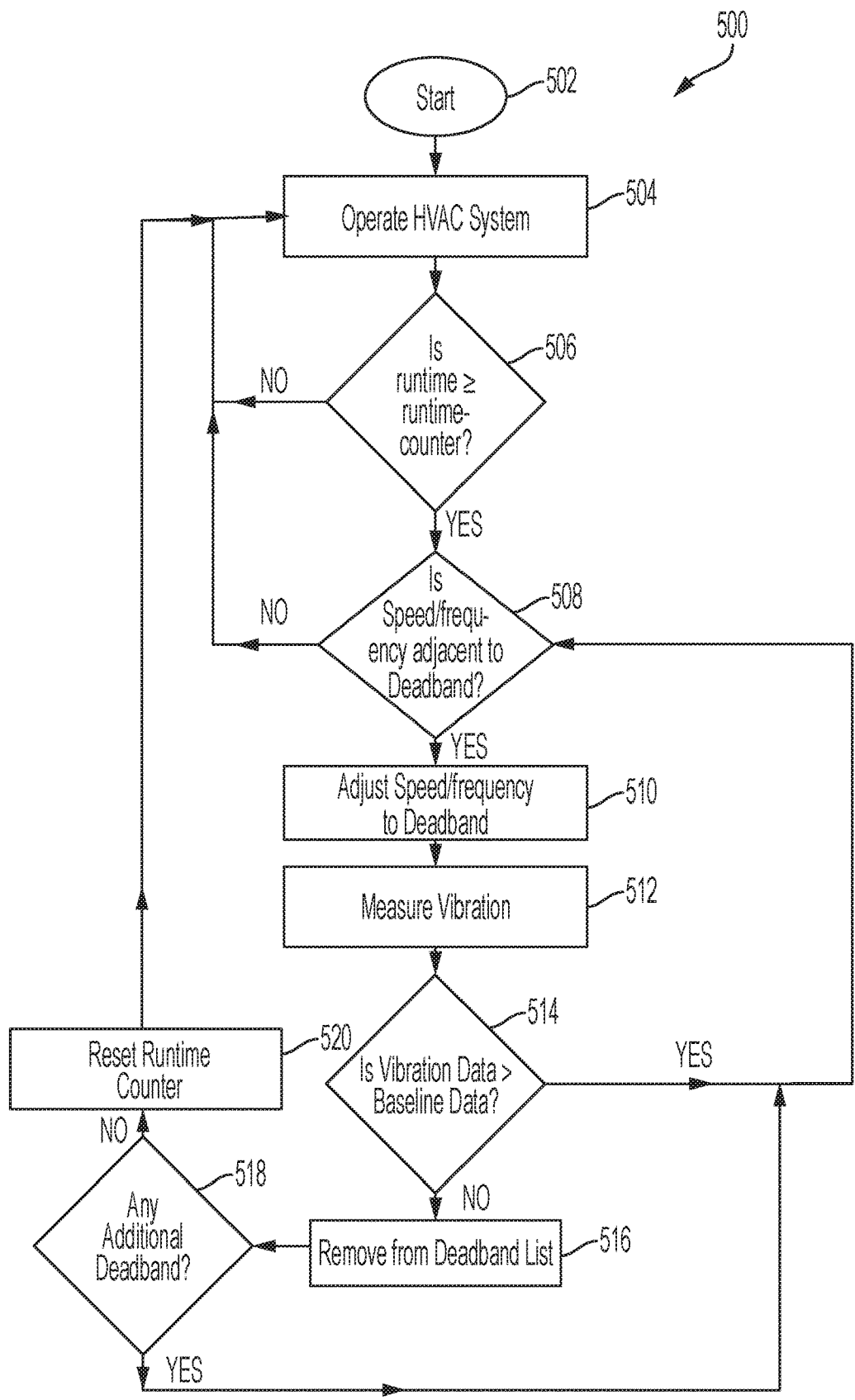
FIG. 5 is a flow diagram illustrating an illustrative process to update deadband frequencies for HVAC system components according to an exemplary embodiment.

FIG. 5 is a flow diagram illustrating an illustrative process 500 to update deadband frequencies for HVAC system components. For illustrative purposes, the process 500 will be described herein relative to FIGS. 1 and 3. The process 500 begins at step 502. At step 504, the HVAC system 100 is operated at a certain speed. At 506, it is determined if the HVAC system 100 runtime is greater than or equal to a runtime counter. If it is determined at step 506 that the HVAC system 100 runtime is not greater than or equal to the runtime counter, the process 500 proceeds to step 504. However, it is determined at step 506 that the HVAC system 100 runtime is greater than or equal to the runtime counter, the process 500 proceeds to step 508.

At 508, it is determined if the operational frequency or operational speed of the variable-speed circulation fan 102 or the variable-speed compressor 112 is adjacent to the deadband frequencies determined in step 310 of FIG. 3. If it is determined at step 508 that the operational frequency or operational speed of the variable-speed circulation fan 102 or the variable-speed compressor 112 is not adjacent to the deadband frequencies determined in step 310 of FIG. 3, the process 500 proceeds to step 504. However, if it is determined at step 506 that the operational frequency or operational speed of the variable-speed circulation fan 102 or the variable-speed compressor 112 is adjacent to the deadband frequencies determined in step 310 of FIG. 3, the process 500 proceeds to step 510. At step 510, the operational frequency or operational speed of the variable-speed circulation fan 102 or the variable-speed compressor 112 is adjusted to the deadband frequency. From step 510, the process 500 proceeds to step 512.

At step 512, the first accelerometer 127(a), which is positioned on the variable-speed circulation fan 102, measures vibration of the variable-speed circulation fan 102. In similar fashion, the second accelerometer 127(b) measures vibration of the variable-speed compressor 112. At step 514, it is determined whether vibration data of the variable-speed circulation fan 102 or variable-speed compressor 112 from the first and second accelerometers 127(a), 127(b) is greater than the pre-defined acceptable baseline vibration data by more than an acceptable amount. If it is determined at step 514 that the vibration data of the variable-speed circulation fan 102 or variable-speed compressor 112 from the first and second accelerometers 127(a). 127(b) is greater than the pre-defined acceptable baseline vibration data by more than an acceptable amount, the process 500 proceeds to step 508. However, if it is determined at step 514 that the vibration data of the variable-speed circulation fan 102 or variable-speed compressor 112 from the first and second accelerometers 127(a). 127(b) is not greater than the pre-defined acceptable baseline vibration data, the process 500 proceeds to step 516. At step 516, frequencies or operational speed of the variable-speed circulation fan 102 or the variable-speed compressor 112 at which the vibration data is no longer greater than pre-defined acceptable baseline vibration data is removed as deadband frequencies. From step 516, the process 500 proceeds to step 518. At step 518, it is determined whether any additional deadband frequencies are available. If it is determined at step 518 that additional deadband frequencies are available, the process 500 proceeds to step 508. However, if it is determined at step 518 that no additional deadband frequencies are available, the process 500 to step 520. At step 520, the HVAC system 100 runtime counter is reset. From step 520, the process 500 proceeds to step 504. For illustrative purposes, the first accelerometer 127(a) and second accelerometer 127(b) are disclosed as being positioned on the variable-speed circulation fan 102 and the variable-speed compressor 112, respectively, for measuring vibrations. However, in other embodiments, the first accelerometer 127(a) and second accelerometer 127(b) may be positioned at other components of the HVAC system 100 such as, for example, the variable-speed condenser fan 113 to measure vibration thereof.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the processor, one or more portions of the system memory, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of minimizing components of a heating, ventilation, and air conditioning (HVAC) system from malfunctioning, the method comprising:
   measuring, by an accelerometer associated with at least one component of the HVAC system, vibration of the at least one component;
   wirelessly receiving, by a controller from the accelerometer associated with at least one component of the HVAC system, actual vibration data reflective of the vibration of the at least one component measured at the measuring step, wherein the controller comprises at least one of a processor, a memory, and a user interface;
   determining, using the controller, whether the actual vibration data received by the controller at the receiving step is greater than pre-defined acceptable baseline vibration data by more than a pre-defined acceptable amount;
   responsive to a determination that the actual vibration data received by the controller at the receiving step is greater than the pre-defined acceptable baseline vibration data by more than the pre-defined acceptable amount, adding, by the controller, an operational frequency of the at least one component corresponding to the actual vibration data as a deadband frequency, wherein deadband frequency is a frequency at which the controller blocks operation of the at least one component of the HVAC system due to severe vibration;
   determining whether changes have occurred in the added operational frequency as the deadband frequency, wherein the determination of whether changes have occurred in the added operational frequency as the deadband frequency comprises:
      determining whether the added operational frequency of the at least one component is adjacent to the deadband frequency;
      responsive to a determination that the added operational frequency of the at least one component is adjacent to the deadband frequency, subsequently measuring, by the accelerometer associated with the at least one component of the HVAC system, vibration of the at least one component; 2 4812-8672-3282, v. 1 Application No.: 16/261,801
      wirelessly receiving, by the controller, the actual vibration data reflective of the vibration of the at least one component measured at the subsequent measuring step;
      determining, using the controller, whether the actual vibration data reflective of the vibration of the at least one component measured at the subsequent measuring step is greater than the pre-defined acceptable baseline vibration data by more than the pre-defined acceptable amount;
      responsive to a determination that the actual vibration data reflective of the vibration of the at least one component measured at the subsequent measuring step is greater than pre-defined acceptable baseline vibration data by more than the pre-defined acceptable amount, adjusting, by the controller, the added operational frequency of the at least one component to the deadband frequency;
      responsive to a determination that the actual vibration data reflective of the vibration of the at least one component measured at the subsequent measuring step is not greater than pre-defined acceptable baseline vibration data by more than the pre-defined acceptable amount, removing, by the controller, the added operational frequency of the at least one component as the deadband frequency; and
   adjusting, by the controller, the operation of at least one component at the deadband frequency.

2. The method of claim 1, wherein the at least one component comprises at least one of a circulation fan, a compressor, a condenser coil, a condenser fan, and an evaporator coil.

3. The method of claim 1, wherein the controller is configured to communicate wirelessly with the accelerometer.

4. The method of claim 1, wherein the pre-defined acceptable baseline vibration data is set in advance by a manufacturer.

5. The method of claim 1, wherein the pre-defined acceptable baseline vibration data is calculated by the controller.

6. A heating, ventilation, and air conditioning (HVAC) system comprising:

an accelerometer associated with at least one component of the HVAC system, wherein the accelerometer is configured to measure vibration of the at least one component;

a controller comprising at least one of a processor, a memory, and a user interface, wherein the controller wirelessly communicates with the accelerometer and directs operation of the HVAC system;

wherein the controller is configured to:
  wirelessly receive actual vibration data reflective of the vibration of the at least one component;
  determine whether the actual vibration data is greater than pre-defined acceptable baseline vibration data by more than a pre-defined acceptable amount;
  responsive to a determination that the actual vibration data is greater than the pre-defined acceptable baseline vibration data by more than the pre-defined acceptable amount, add, by the controller, an operational frequency of the at least one component corresponding to the actual vibration data as a deadband frequency, wherein deadband frequency is a frequency at which the controller blocks operation of the at least one component of the HVAC system due to severe vibration;
  determine whether changes have occurred in the added operational frequency as the deadband frequency;
  determine whether the added operational frequency of the at least one component is adjacent to the deadband frequency;
  responsive to a determination that the added operational frequency of the at least one component is adjacent to the deadband frequency, subsequently receive the actual vibration data measured by the accelerometer;
  determine whether the actual vibration data, subsequently received by the controller, is greater than pre-defined acceptable baseline vibration data by more than the pre-defined acceptable amount;
  responsive to a determination that the actual vibration data, subsequently received by the controller, is greater than the pre-defined acceptable baseline vibration data by more than the pre-defined acceptable amount, adjust the added operational frequency of the at least one component to the deadband frequency;
  responsive to a determination that the actual vibration data, subsequently received by the controller, is not greater than pre-defined acceptable baseline vibration data by more than the pre-defined acceptable amount, remove the added operational frequency of the at least one component as the deadband frequency; and
  adjusting, by the controller, the operation of at least one component at the deadband frequency.

7. The HVAC system of claim 6, wherein the at least one component comprises at least one of a circulation fan, compressor, a condenser coil, a condenser fan, and an evaporator coil.

8. The HVAC system of claim 6, wherein the controller is configured to communicate wirelessly with the accelerometer.

9. The HVAC system of claim 6, wherein the pre-defined acceptable baseline vibration data is set in advance by a manufacturer.

10. The HVAC system of claim 6, wherein the pre-defined acceptable baseline vibration data is calculated by the controller.

11. A method of minimizing components of a heating, ventilation, and air conditioning (HVAC) system from malfunctioning, the method comprising:
  measuring, by an accelerometer associated with at least one component of the HVAC system, vibration of the at least one component;
  wirelessly receiving, by a controller from the accelerometer associated with at least one component of the HVAC system, actual vibration data reflective of the vibration of the at least one component measured at the measuring step, wherein the controller comprises at least one of a processor, a memory, and a user interface;
  determining, using the controller, whether the actual vibration data received by the controller at the receiving step is greater than pre-defined acceptable baseline vibration data by more than a pre-defined acceptable amount; and
  responsive to a determination that the actual vibration data received by the controller at the receiving step is greater than the pre-defined acceptable baseline vibration data by more than the pre-defined acceptable amount, adding, by the controller, an operational frequency of the at least one component corresponding to the actual vibration data as a deadband frequency, wherein deadband frequency is a frequency at which the controller blocks operation of the at least one component of the HVAC system due to severe vibration;
  determining whether changes have occurred in the added operational frequency as the deadband frequency, wherein the determination of whether changes have occurred in the added operational frequency as the deadband frequency comprises:
    determining whether the added operational frequency of the at least one component is adjacent to the deadband frequency;
    responsive to a determination that the added operational frequency of the at least one component is adjacent to the deadband frequency, measuring, by the accelerometer associated with the at least one component of the HVAC system, vibration of the at least one component;
    wirelessly receiving, by the controller, the actual vibration data reflective of the vibration of the at least one component measured at the subsequent measuring step;
    determining, using the controller, whether the actual vibration data reflective of the vibration of the at least one component measured at the subsequent measuring step is greater than the pre-defined acceptable baseline vibration data by more than the pre-defined acceptable amount;
    responsive to a determination that the actual vibration data reflective of the vibration of the at least one component measured at the subsequent measuring step is greater than pre-defined acceptable baseline vibration data by more than the pre-defined acceptable amount, adjusting, by the controller, the added operational frequency of the at least one component to the deadband frequency;
    responsive to a determination that the actual vibration data reflective of the vibration of the at least one component measured at the subsequent measuring step is not greater than pre-defined acceptable baseline vibration data by more than the pre-defined acceptable amount, removing, by the controller, the added operational frequency of the at least one component as the deadband frequency;

allowing, by the controller, operation of the at least one component at all frequencies except the deadband frequency; and adjusting, by the controller, the operation of at least one component at the deadband frequency.

12. The method of claim 11, wherein the at least one component comprises at least one of a circulation fan, a compressor, a condenser coil, a condenser fan, and an evaporator coil.

* * * * *

UNITED STATES PATENT AND TRADEMARK OFFICE
CERTIFICATE OF CORRECTION

PATENT NO. : 11,067,322 B2  
APPLICATION NO. : 16/261801  
DATED : July 20, 2021  
INVENTOR(S) : Wenqian Liu et al.

Page 1 of 1

It is certified that error appears in the above-identified patent and that said Letters Patent is hereby corrected as shown below:

In the Specification

| | |
|---|---|
| Column 5, Line 62 | Replace "arm configured to" with --are arm configured to-- |
| Column 7, Line 32 | Replace "127(a). 127(b)" with --127(a), 127(b)-- |
| Column 8, Line 52 | Replace "127(a). 127(b)" with --127(a), 127(b)-- |
| Column 9, Line 56 | Replace "127(a). 127(b)" with --127(a), 127(b)-- |
| Column 9, Line 62 | Replace "127(a). 127(b)" with --127(a), 127(b)-- |

In the Claims

| | |
|---|---|
| Column 12, Claim 1, Lines 22-23 | Replace "component; 2 4812-8672-3282, v. 1 Application No.: 16/261,801" with --component;-- |

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*